US005183526A

United States Patent [19]

Walter

[11] Patent Number: 5,183,526

[45] Date of Patent: Feb. 2, 1993

[54] REPAIR SEALER ACCESSORY

[75] Inventor: George E. Walter, Tonawanda, N.Y.

[73] Assignee: Moore Business Forms, Inc., Grand Island, N.Y.

[21] Appl. No.: 765,814

[22] Filed: Sep. 26, 1991

[51] Int. Cl.[5] ............ B32B 31/00

[52] U.S. Cl. ............ 156/556; 156/352; 156/365; 74/608; 74/612; 74/613; 271/2; 271/9; 271/171; 271/240; 100/53; 400/642; 400/713; 493/419

[58] Field of Search ............ 156/351, 352, 365, 368, 156/556; 271/9, 226, 256, 257, 273, 274, 2, 240, 171; 100/53; 400/703, 705.5, 709.1, 713, 642, 690, 693, 690.1; 493/419, 420, 421; 74/608, 609, 612, 613; 355/308

[56] References Cited

U.S. PATENT DOCUMENTS 3,577,300 5/1971 Glaze, Jr. et al. ............ 156/441.5
3,855,041 12/1974 Kunisch ............ 156/442.2
3,957,366 5/1976 Taylor et al. ............ 271/34 X
4,033,807 7/1977 Neill et al. ............ 156/442.2 X
4,295,421 10/1981 Abendroth et al. ............ 100/53 X
4,337,935 7/1982 Sawada et al. ............ 271/9
4,348,249 9/1982 Denzin ............ 156/442.2
4,371,416 2/1983 Denzin ............ 156/441.5
4,540,298 9/1985 Kulow ............ 400/635

*Primary Examiner*—David A. Simmons
*Assistant Examiner*—James J. Engel, Jr.
*Attorney, Agent, or Firm*—Nixon & Vanderhye

[57] ABSTRACT

An apparatus and method are provided for facilitating manual feeding of business forms into business forms handling equipment to bypass the automatic feeder, primarily in the production of mailers from forms having pressure sensitive adhesive strips. Mounted at the interface between the conveyor and folder of the handling equipment is a transparent plastic plate having a slot with forms guides, and a forms centering scale adjacent the slot. A finger opening in, and an upstanding finger tab on, the quadrate plate may be provided to allow it to be lifted out of place covering the interface area between the conveyor and folder. An interlock engaging projection is provided on the plate for stopping operation of the equipment when it is removed. One may bypass the automatic feeding of the conveyor by manually inserting forms into the slot guided by the forms guides.

16 Claims, 3 Drawing Sheets

REPAIR SEALER ACCESSORY

BACKGROUND AND SUMMARY OF THE INVENTION

In automatic forms handling equipment, particularly in the production of mailer type business forms, forms are automatically fed from a conveyor to a folder or other forms handling equipment, and then on to a sealing mechanism to be constructed into the mailers. One particular system for production of mailers in this manner is sold by Moore Business Forms, Inc. of Lake Forest, Ill. under the trade designation M8158/M4800. Speedisealer® pressure seal system. The business forms associated with this system have pressure activated adhesive, and after buckle folding are fed to the pressure sealer to be constructed into the final mailers. A conveyor for such a system is shown in copending application Ser. No. 07/604,858 filed Oct. 26, 1990, and an exemplary pressure sealer is shown in copending application Ser. No. 07/417,775 filed Oct. 6, 1989.

While the automatic handling equipment works very well for most of the forms being processed, there are occasions when a form may not be fully processed by the system due to jams, misfolds, or other inadvertent stoppages of the system. Also, there are occasions when small quantities of form product are desired to be processed, and it is not worthwhile to set up the automatic handling equipment for such a small quantity of forms. Heretofore, it has been very difficult to accommodate these situations—namely, the less than fully processed form, or small quantities of off form products. Under such circumstances, it was typically necessary to place the documents into individual conventional mailing envelopes, or window envelopes, resulting in extra handling and material costs.

According to the present invention, a method and apparatus are provided which overcome the problems discussed heretofore. According to the present invention it is possible to allow a user to easily reintroduce forms that have not been fully processed back into the forms handling equipment for normal processing thereof. Also according to the invention, it is a simple and easy procedure to manually feed small quantities of off form product into the equipment without requiring modification of the equipment and displacement of the conveyor with respect to the other forms handling components. While the invention is particularly useful with respect to the production of mailer type business forms, specifically using a pressure seal system such as the Moore M8158/M4800 Speedisealer® pressure seal system, the invention is applicable to other forms handling equipment and procedures where normally an automatic conveyance of forms to a forms handler is provided.

According to one aspect of the present invention, a method of handling business forms, utilizing a conveyor connected to a forms handler with an area of interface between the conveyor and forms handler, is provided. The method comprises the steps of: (a) normally automatically feeding forms into the conveyor, the conveyor transporting the forms to the forms handler; and (b) occasionally bypassing the conveyor and manually feeding forms one at a time into the forms handler, without disturbing the position of the conveyor with respect to the forms handler. Where the forms handler is a folder and is connected to a pressure sealer (with the forms having strips of pressure seal adhesive thereon), the method comprises the further steps, after both steps (a) and (b), of folding the automatically or manually fed forms and then effecting pressure sealing thereof into mailers.

In the practice of the invention, preferably a plate having a slot perpendicular to the direction of forms conveyance by the conveyor is provided at the area of interface with adjustable forms guides provided in the slot, and step (b) is practiced by adjusting the position of the forms guides in the slot, and introducing forms one at a time into the slot guided by the forms guide. The plate is removably mounted at the area of interface between the conveyor and forms handler with the plate edges unexposed, and there is the further step of, when manual feeding of forms is no longer desired, manually grasping a surface manifestation (finger opening or finger tab) on the plate distinct from the edges, and removing the plate from its position at the interface between the conveyor and forms handler.

According to another aspect of the present invention, apparatus for handling business forms is provided. The apparatus comprises: Conveyor means for conveying business forms to a folder and sealer, the conveyor means including a first, infeed, end, and a second end adjacent the folder, the conveyor means conveying forms in a direction of conveyance from the first to the second ends thereof. A housing for containing the conveyor means, the housing means defining an open portion adjacent the area between the conveyor means and folder. Form introduction means disposed at the open portion, for covering the opening portion, and allowing bypass of the conveyor first end to allow introduction of individual forms directly into the area between the conveyor means and folder. The form introduction means comprises: a plate; means defining a slot in the plate perpendicular to the direction of conveyance of the conveyor means; adjustable form guide means associated with the slot to provide an adjustable guided width of the slot for introduction of forms; and surface means formed on the plate allowing movement of the plate from a first position covering the opening to a second position not covering the opening. The conveyor means typically includes a safety interlock at the opening for preventing operation of the conveyor and sealer if the opening is not covered. In such circumstances the form introduction means further comprises an element attached to the plate for engaging the interlock to allow operation of the conveyor means and folder when the plate is in its first position.

The invention also contemplates and, apparatus per se for facilitating manual business forms introduction which comprises the following elements: A plate of transparent material having a plurality of edges. Means defining an elongated slot in the plate. Adjustable form guide means disposed in the elongated slot for providing readily adjustable guides for forms to be introduced into the slot. A forms centering scale disposed at the slot; and, surface means associated with the plate for allowing manual grasping and movement of it if the edges thereof are not accessible.

The forms centering scale is an opaque scale mounted to the plate at the slot, with the center of the scale corresponding to the center of the slot. The surface means may comprise a finger opening in a central portion of the plate, and a flange upstanding from the face of the plate along an edge of the plate parallel to the slot. Preferably, the plate is quadrate, having first and second edges parallel to the slot and third and fourth edges perpendicular to it, and metal strips are disposed at the first and second edges with the upstanding flange part of a metal strip at the first edge. The element for engaging the safety interlock comprises a metal extension of the second edge metal strip, disposed on the opposite face of the plate as the upstanding flange.

It is a primary object of the present invention to provide for the simple and effective re-introduction of partially processed forms, and small quantities of off form product, into an otherwise automatic forms handling system. This and other objects of the invention will become clear from an inspection of the detailed description of the invention and from the appended claims.

DETAILED DESCRIPTION OF THE DRAWINGS

Figure 1:
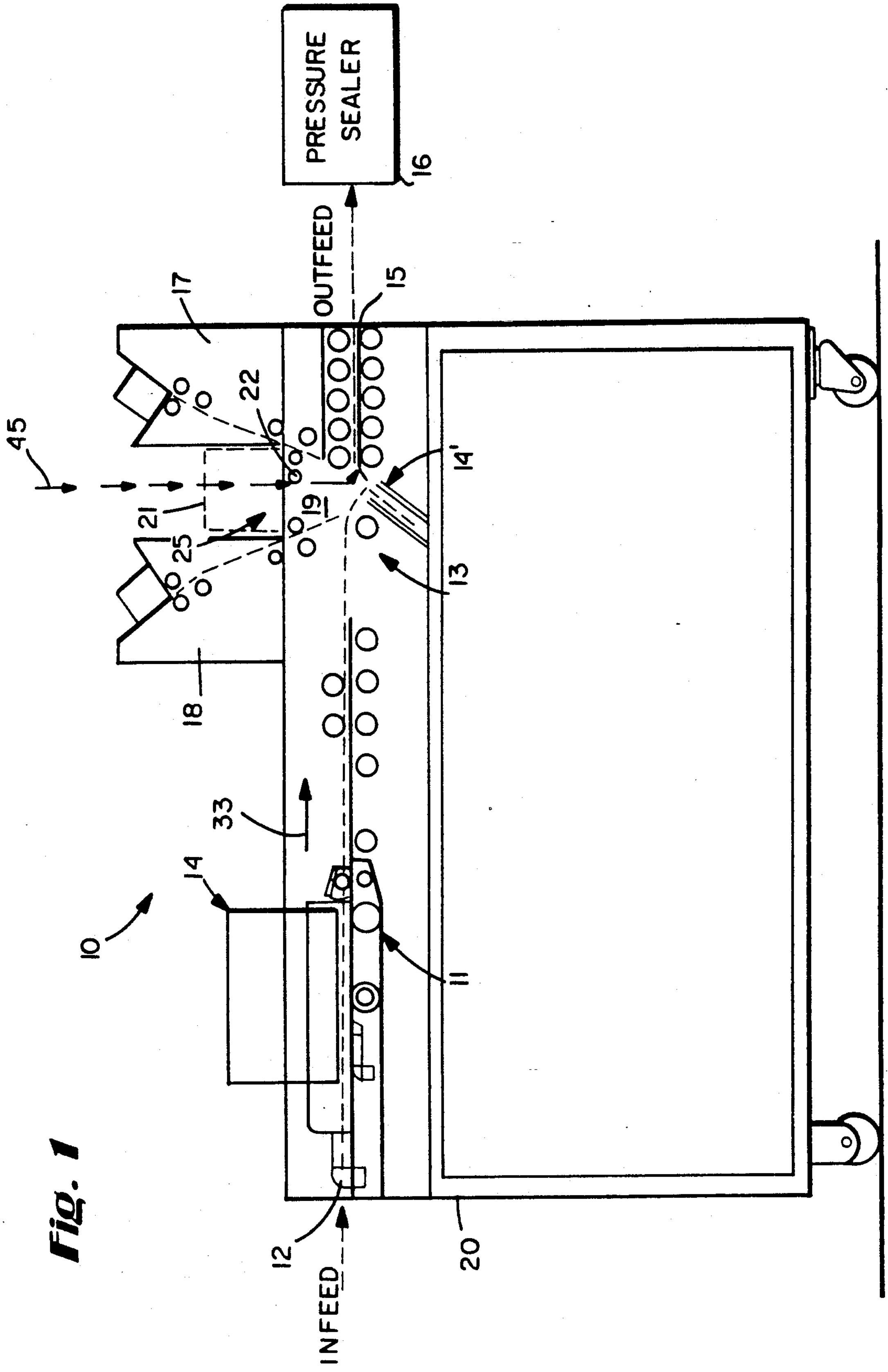
FIG. 1 is a side schematic view of an exemplary automatic forms handling equipment according to the invention.

The apparatus illustrated generally by reference numeral 10 in FIG. 1 comprises components of a Moore M8158/M4800 Speedisealer® pressure seal system. Major component parts include a conveyor means 11 having a first infeed end 12 and a second end 13, with provision for feeding forms to be turned into mailers from a stack 14, a buckle folder shown generally by reference numeral 14', with an outfeed 15 from the buckle folder 14' to a pressure sealer 16. The conveyor mechanism 11 per se is described generally in copending application Ser. No. 07/604,858, while the pressure sealer 16 is described generally in copending application Ser. No. 07/417,775. First and second nesters 17, 18 preferably are also provided at the area of interface 19 between the conveyor means 11 and the folder 14'. The nesters 17, 18 nest up to two inserts in the business forms being constructed.

The conveyor means 11 (and typically folder 14' also) are contained within a housing 20 which includes means defining an opening at the area of interface 19 (between nesters 17, 18), which openings typically are closed by a removable (e.g. hinged) cover, shown generally by dotted line at 21 in FIG. 1. A conventional safety interlock switch/mechanism 22 is provided for cooperation with the cover 21 to prevent operation of the conveyor means 11 or folder 14 should the opening at the area interface 19 not be covered.

Figure 3:
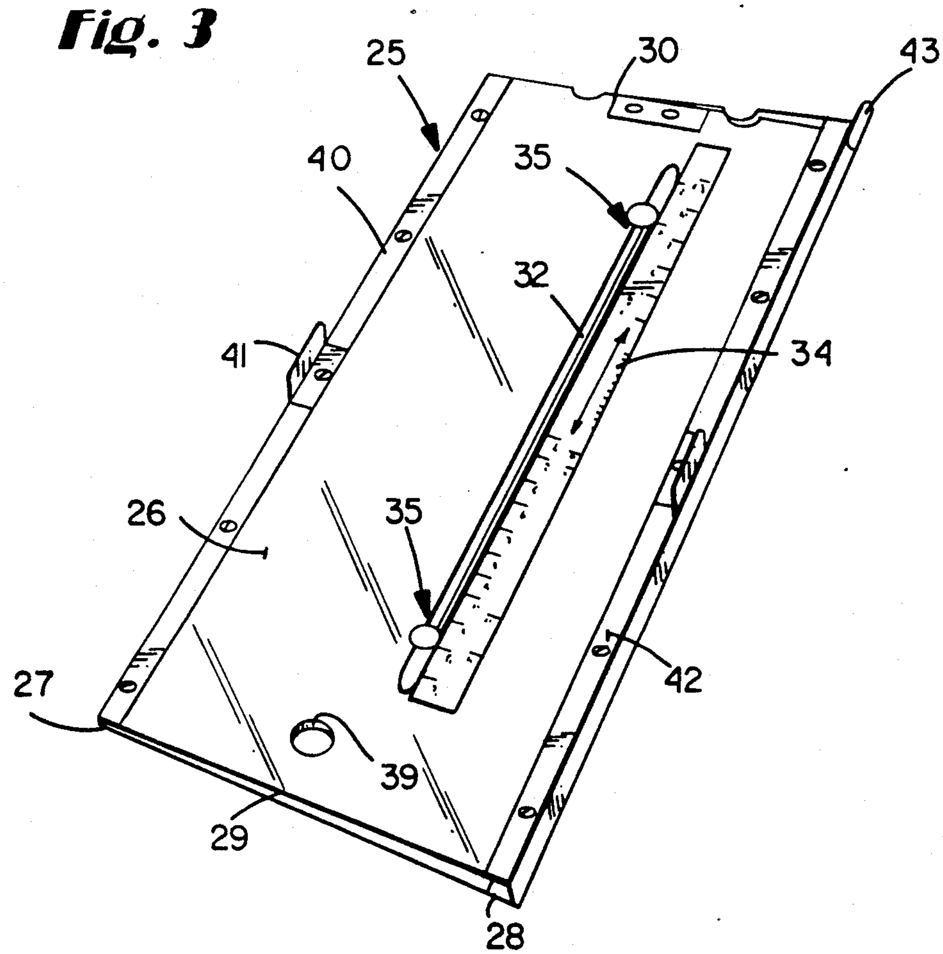
FIG. 3 is a top perspective view of the forms introduction facilitating plate according to the invention.
Figure 4:
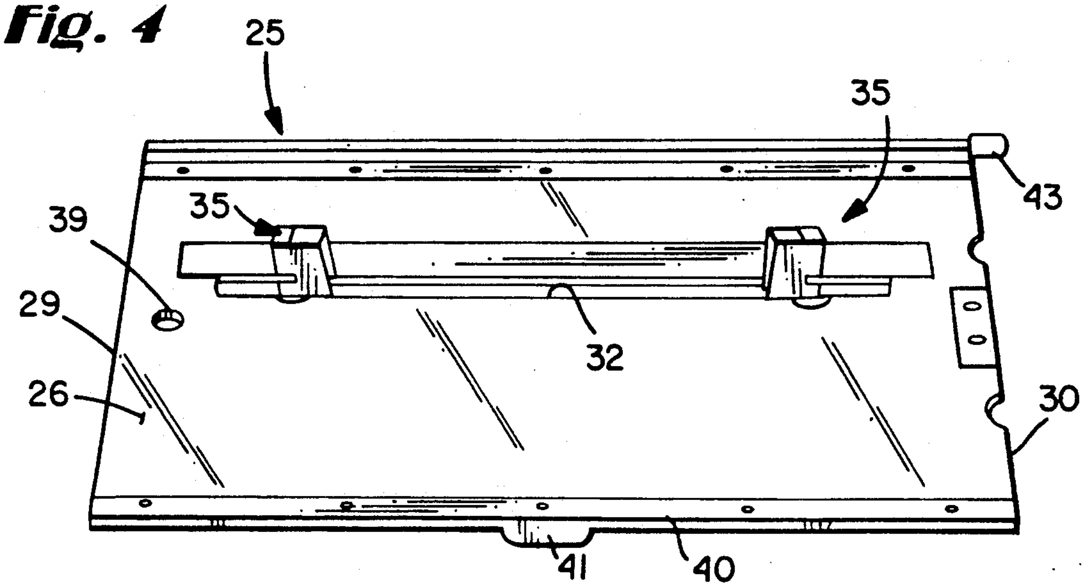
FIG. 4 is a bottom perspective view of the plate of FIG. 3.

According to the present invention, a forms introduction facilitating means is provided at the open portion of the housing 20 for covering the opening, and allowing bypass of the conveyor first end 12 (that is, bypassing automatic feeding by the conveyor means 11) and introduction of individual forms directly into the interface area 19. The forms introduction means is shown generally by reference numeral 25 in FIG. 1, and is shown in more detail in FIGS. 2 through 4, and comprises a preferably quadrate plate 26 having a first edge 27, second edge 28, third edge 29, and fourth edge 30. The plate 26 preferably is of transparent material, such as a rigid transparent plastic, and has means defining a slot 32 therein. The slot 32 is elongated in a dimension perpendicular to the direction of conveyance 33 (see FIG. 1) of forms by the conveyor means 11. The edges 27, 28 are parallel to the slot 32, and the edges 29, 30 perpendicular thereto.

Figure 2:
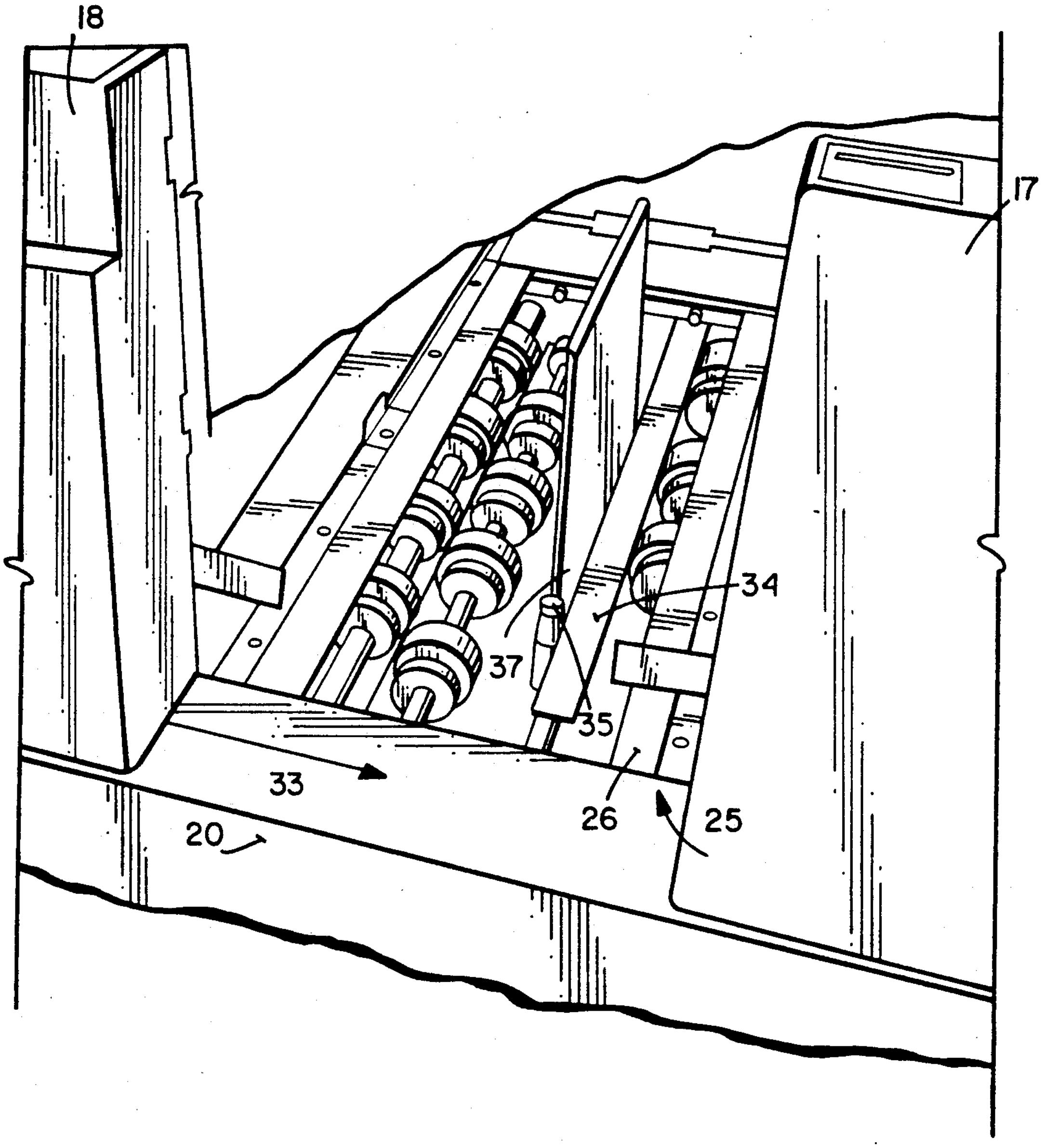
FIG. 2 is a top partial perspective view showing the area between the nesters of the form handling equipment of FIG. 1, with the forms introduction facilitating plate according to the invention in place.

Mounted on the plate 26, preferably next to and parallel to the slot 32, is a forms centering scale 34, having the center thereof at the center of the slot 32, and of an opaque material such as metal. The centering scale 34 has indicia thereon which allows proper alignment of forms fed by the means 25. Located within the slot 32 are a pair of conventional adjustable forms guides 35 which can be moved to any position desired within the slot 32, and guide the edges of the form through the slot 32 into operative association with the folder 14'. FIG. 2 shows a form 37 being fed into operative association with the equipment, being guided by the forms guides 35.

The plate 26 also has surface means associated therewith for allowing the plate 26 to be manually grasped and moved from its position covering the area 19. When the plate 26 is in its functional position, the edges 27 through 30 thereof are not accessible. Therefore, the surface means must be something besides the edges. As illustrate.d in FIGS. 3 and 4 in particular, the surface means may take the form of a finger opening 39. Alternatively, or preferably additionally, a metal strip 40 may be provided along the edge 27 and may have an upstanding flange or tab 41, extending upwardly from the top surface of the plate 26. A metal strip 42 may also be provided along the second edge 28, and an extension element 43 thereof is preferably provided on the bottom face of the plate 16 for engaging the interlock mechanism 22 to defeat the interlock when the plate 26 is in proper position closing the interface at the area 19.

The forms introduction facilitating means 25 may normally be kept in place and the cover 21 closed over it, or it may be removed when not in use (when not feeding manual forms to the equipment).

In normal utilization of the apparatus 10, forms are automatically fed from stack 14 by the conveyor means 11 in the direction 33 to the buckle folder 14', and then to the pressure sealer 16, with nesting inserts provided by one or both of the nesters 17, 18. Should a jam-up occur, cover 21 is opened and the jam-up is removed. The forms that have not been completely processed are removed. The plate 26 is put in place covering the opening 19 and closing the interlock 22. Then an only partially processed form 37 is manually fed as illustrated in FIG. 2, and by the pathway arrow 45 in FIG. 1, into the outfeed 15 and then to the pressure sealer 16, or into the buckle folder 14' and then to the outfeed 15 and the pressure sealer 16.

The guides 35 are adjusted to accommodate the proper width of the form, utilizing the centering scale 34, and the form 37 is inserted into the slot 32. The operator can see through the plate 26 and make sure that the form is being properly directed and processed. The same technique can be utilized when it is desired to run only a few off forms, the forms being manually fed into the slot 32 one at a time. While the plate 26 can be left in place at all times if desired, if it preferable to remove it, the operator either places his/her finger in the finger hole 39 and/or grasps the finger tab 41 and pulls upwardly on the plate 26, detaching the plate 26 from the housing 20, and exposing its previously unexposed edges 27 through 30.

It will thus be seen that according to the present invention an effective mechanism, method, and apparatus are provided for simply but yet efficiently processing only a few off form products, or for processing forms that have not been earlier completely processed because of a jam, misfolding, or other inadvertent stoppage of the equipment 11, 14', 16.

While the invention has been herein shown and described in what is presently conceived to be the most practical and preferred embodiment, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. Apparatus for handling business forms, comprising:

conveyor means for conveying business forms to a folder, said conveyor means including a first, infeed, end, and a second end adjacent said folder, said conveyor means conveying forms in a direction of conveyance from said first to said second ends thereof;

a housing for containing said conveyor means, said housing means defining an opening portion adjacent the area between said conveyor means and folder; and form introduction means disposed at said opening portion, for covering said opening portion, and allowing bypass of said conveyor first end to allow introduction of individual forms directly into the area between said conveyor means and folder, said form introduction means comprising: a plate; means defining a slot in said plate perpendicular to the direction of conveyance of said conveyor means; adjustable form guide means associated with said slot to provide an adjustable guided width of said slot for introduction of forms; and surface means formed on said plate allowing movement of said plate from a first position covering said opening to a second position not covering said opening.

2. Apparatus as recited in claim 1 wherein said conveyor means further comprises a safety interlock at said opening for preventing operation of said conveyor means and sealer if said opening is not covered; and wherein said form introduction means further comprises an element attached to said plate for engaging said interlock to allow operation of said conveyor means and folder when said plate is in said first position.

3. Apparatus as recited in claim 2 wherein said plate is primarily of transparent material so that an operator can view said conveyor means and folder through said plate.

4. Apparatus as recited in claim 3 wherein said form introduction means further comprises a forms centering scale disposed on said plate at said slot.

5. Apparatus as recited in claim 4 wherein said surface means comprises means defining a finger opening in a central portion of said plate.

6. Apparatus as recited in claim 5 wherein said surface means further comprises an upstanding flange along an edge of said plate parallel to said slot.

7. Apparatus as recited in claim 6 wherein said plate is quadrate, having first and second edges parallel to said slot and third and fourth edges perpendicular thereto, and is of transparent rigid plastic material, having metal strips disposed at said first and second edges, said upstanding flange being part of a metal strip at said first edge.

8. Apparatus as recited in claim 7 wherein said element for engaging said interlock comprises a metal extension of said second edge metal strip, disposed below said plate.

9. Apparatus as recited in claim 1 further comprising a pressure sealer connected to said folder on the opposite side thereof from said conveyor means.

10. Apparatus as recited in claim 9 wherein said conveyor means and folder further comprise first and second nesters extending upwardly from said housing, for supplying inserts to said conveyor means and folder; and wherein said forms introduction means plate is disposed horizontally, and between said nesters in the direction of conveyance of said conveyor means.

11. Apparatus as recited in claim 10 further comprising a cover for covering said housing opening, said cover movable to also cover, or uncover, said forms introduction means.

12. Apparatus facilitating manual business forms introduction, comprising:

a plate of transparent material having a plurality of edges;

means defining an elongated slot in said plate;

adjustable forms guide means disposed in said elongated slot for providing readily adjustable guides for forms to be introduced into said slot;

a forms centering scale disposed at said slot; and surface means associated with said plate for allowing manual grasping and movement thereof if the edges thereof are not accessible.

13. Apparatus as recited in claim 12 wherein said forms centering scale is an opaque scale mounted to said plate at said slot, with the center of said scale corresponding to the center of said slot.

14. Apparatus as recited in claim 12 wherein said surface means comprises means defining a finger opening in a central portion of said plate, and a flange upstanding from a face of said plate along an edge of said plate parallel to said slot.

15. Apparatus as recited in claim 14 wherein said plate is quadrate, having first and second edges parallel to said slot and third and fourth edges perpendicular thereto, and is of transparent rigid plastic material, having metal strips disposed at said first and second edges, said upstanding flange being part of a metal strip at said first edge.

16. Apparatus as recited in claim 15 further comprising an element associated with said plate for engaging a safety interlock, said element comprising a metal extension of said second edge metal strip, disposed on the opposite face of said plate as said upstanding flange.

* * * * *